: United States Patent (10) Patent No.: US 8,577,539 B1
Morrison et al. (45) Date of Patent: Nov. 5, 2013

(54) CODED APERTURE AIDED NAVIGATION AND GEOLOCATION SYSTEMS

(75) Inventors: Jamie R. Morrison, Niceville, FL (US); John F. Raquet, Beavercreek, OH (US); Michael J. Veth, Niceville, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 98 days.

(21) Appl. No.: 13/015,272

(22) Filed: Jan. 27, 2011

Related U.S. Application Data

(60) Provisional application No. 61/298,573, filed on Jan. 27, 2010.

(51) Int. Cl.
*G01C 22/00* (2006.01)
*G05D 1/00* (2006.01)

(52) U.S. Cl.
USPC .............................................. 701/28; 701/29

(58) Field of Classification Search
USPC ................. 701/28, 3, 445; 359/850; 250/216; 382/154
See application file for complete search history.

(56) References Cited

U.S. PATENT DOCUMENTS

| | | | |
|---|---|---|---|
| 7,671,321 B2 * | 3/2010 | Perlman et al. ................ 250/216 |
| 7,697,748 B2 * | 4/2010 | Dimsdale et al. .............. 382/154 |
| 8,086,405 B2 * | 12/2011 | Han et al. ........................ 701/445 |
| 2008/0225420 A1 * | 9/2008 | Barrows et al. ................ 359/850 |
| 2010/0114408 A1 * | 5/2010 | Goossen ............................ 701/3 |
| 2011/0178658 A1 * | 7/2011 | Kotaba et al. ..................... 701/3 |
| 2012/0078510 A1 * | 3/2012 | Ma et al. ........................ 701/426 |

* cited by examiner

*Primary Examiner* — Thomas Black
*Assistant Examiner* — Robert Payne
(74) *Attorney, Agent, or Firm* — AFMCLO/JAZ; Jeffrey Moore

(57) ABSTRACT

A micro air vehicle having a navigation system with a single camera to determine position and attitude of the vehicle using changes the direction to the observed features. The difference between the expected directions to the observed features versus the measured direction to the observed features is used to correct a navigation solution.

10 Claims, 4 Drawing Sheets

CODED APERTURE AIDED NAVIGATION AND GEOLOCATION SYSTEMS

CROSS-REFERENCE TO RELATED APPLICATION

This application claims benefit of U.S. Provisional Patent Application Ser. No. 61/298,573, filed Jan. 27, 2010, titled "Coded Aperture Aided Navigation and Geolocation System" to Morrison et al., the disclosure of which is expressly incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Tremendous gains have been made in recent years towards achieving the goal of performing autonomous navigation of micro air vehicles (MAV), however several considerable challenges remain. Perhaps the most significant obstacle is that satellite based navigation aids such as the Global Position System (GPS) may either perform poorly or be altogether unavailable when used for indoor environments. An inertial navigation system is effective for indoor navigation applications because these systems do not rely on the reception of external signals and newer models are improving in performance while decreasing in size. However, smaller inertial navigation systems generally require additional sensing capabilities to correct inherent instabilities if they are to be used for an extended period of time. A camera based vision system offers the necessary sensing capabilities in a form that is increasingly available with greater imaging performance and lower size, weight and power requirements. A primary impediment to the adoption of vision aided inertial navigation systems however is ambiguity regarding scale.

Loss of access to the GPS through interference from disturbances from the ionosphere, competing radio signals, or obstruction by urban structures is a significant challenge for a modern vehicle navigation system to overcome. When this challenge is anticipated, a favored solution is reliance on a self-contained inertial navigation system (INS). When an INS is set or initialized to correct vehicle location and pose estimates, navigation errors are often small, such that they may be neglected for short periods of time. Errors, however, can grow in time without bound such that an uncorrected INS becomes unstable. An INS is often supplemented by complimentary sensor systems to correct navigation errors such that they remain relatively small. Camera based sensing systems have been used to provide correction to an INS by exploiting the persistence of image features that are detectable from different perspectives. These systems use multiple camera images for feature heading measurements to estimate constraints to either the navigation solution or the slant range to the features. What is missing is an INS solution using a camera system that captures both heading and slant range to each feature in a single image, thereby enabling estimation of the location of the feature relative to the vehicle with just one camera.

From a single conventional image, a vision system can be used to determine the heading from the camera to a feature within a scene; however the range to the feature cannot be determined without a priori information. This ambiguity frustrates estimation of the location of the feature in the global coordinate frame. A common approach to this problem is triangulation of image feature location by observing the feature from different perspectives by one or more cameras. Using more than one camera for a micro air vehicle is not desirable, as each additional camera adds weight and consumes power while the baseline distance between any pair of cameras would be necessarily small. Triangulation from a single moving camera is also not desirable, as the estimated distances between any two locations from which the perspective images are captured are determined by the navigation solutions that are to be solved. Other methods include the exploitation of a priori information, such as an expectation of the height above the ground, the shape of the horizon, or a mapping of the region to be traversed.

SUMMARY OF THE INVENTION

According to one aspect of the present invention there is provided resolving scale ambiguity by using a vision aided inertial navigation system augmented with a coded aperture implemented in a camera to measure range and resolve scale ambiguity, thereby significantly improving the performance of a vision aided inertial navigation system. Augmenting with a coded aperture allows estimation of both heading and slant range to features. Location estimation of each feature may then be estimated with respect to the global coordinate frame. The inertial navigation system is updated in a closed loop with a dynamic Bayesian network, such as a recursive estimator, including an extended Kalman filter. Using the inertial navigation system, the Kalman filter predicts the location and covariance for each feature relative to the camera at the time of the next image capture. The residuals for the system update are the differences between the expected feature locations relative to the camera and the measured feature locations.

Heading and slant range measurements are determined from camera images by providing a camera with a coded aperture and a narrow depth of field such that range information is contained within the defocus blur structure. The resulting vision aiding system can provide robust INS correction, allowing greater non-GPS navigation performance.

The approach of using a coded aperture to measure range from an image is an advanced form of the classical depth-from-defocus technique. Depth-from-defocus is a technique of intentionally blurring image features by using a defocused camera lens such that the amount of blur is a function of the range to the feature. This technique generally requires multiple images to discern the contribution of feature blur due to defocus from the feature blur that can be attributed to the feature itself. The rounded shape of the blur in the classical system is a function of the rounded aperture present in most traditional camera systems. By replacing the typically rounded aperture with a coded aperture, the blur of the features is coded rather than round. The contribution of image blur due to defocus may be then distinguished through frequency analysis and regression of a single image. An estimation of the range to a feature that does not depend on the navigation solution may then be used to update the inertial navigation system.

The significantly smaller size and weight of a micro air vehicle necessitates judicious use of both limited payload of the sensors and sensor power requirements. The generally higher power requirements of active sensors, such as laser radar (LIDAR), render such sensors less desirable than passive sensors. While INS performance determines in part the amount of time that the INS location estimates are sufficient, smaller systems necessary for a MAV are accurate for significantly shorter time periods than those more commonly used for larger systems. While aiding an INS using stereopsis between multiple cameras can provide significant correction to the INS solution, a single camera vision system, however, is also preferential over a multi-camera system for the smaller vehicle. Several vision aided INS proposals have been shown to perform well if a topographic map is available. The image data constrains the navigation solution, or the slant range to the location points is estimated.

For an indoor environment, moveable occlusions such as furniture and doorways, as well as shadowing due to changes in illumination from lights that may or may not be on, reliance upon a map is impractical. Using visual information to constrain the navigation solution during indoor navigation has been shown to be susceptible to significant attitude errors over a short period of travel (approximately one minute). When estimating slant range to a feature, an incorrect range estimate has been shown to significantly degrade the corrective performance of the vision aided system.

The proposed coded aperture vision aiding of the INS requires no map, estimates slant range rather than attempting to constrain the navigation solution, and does not transmit errors in the uncorrected INS solution to the slant range estimate. The proposed navigation system offers superior performance for indoor MAV navigation.

According to still another aspect of the present invention, there is provided a system with a coded aperture where the covariance of the feature location estimate is a function of heading and range measurements. The covariance of the feature location estimate is a function of heading measurements only. The simulation allows for error and covariance analysis of the navigation solution for each model, as well as error and covariance analysis of estimated feature locations.

The addition of the coded aperture improves the performance of the navigation system by both providing feature location estimates with a smaller covariance due to the addition of the range information, thereby reducing the measurement covariance. Also, a greater accuracy in the range estimates result in reduced bias in the navigation solution through reducing linearization errors of the extended Kalman filter.

DETAILED DESCRIPTION

Figure 1:
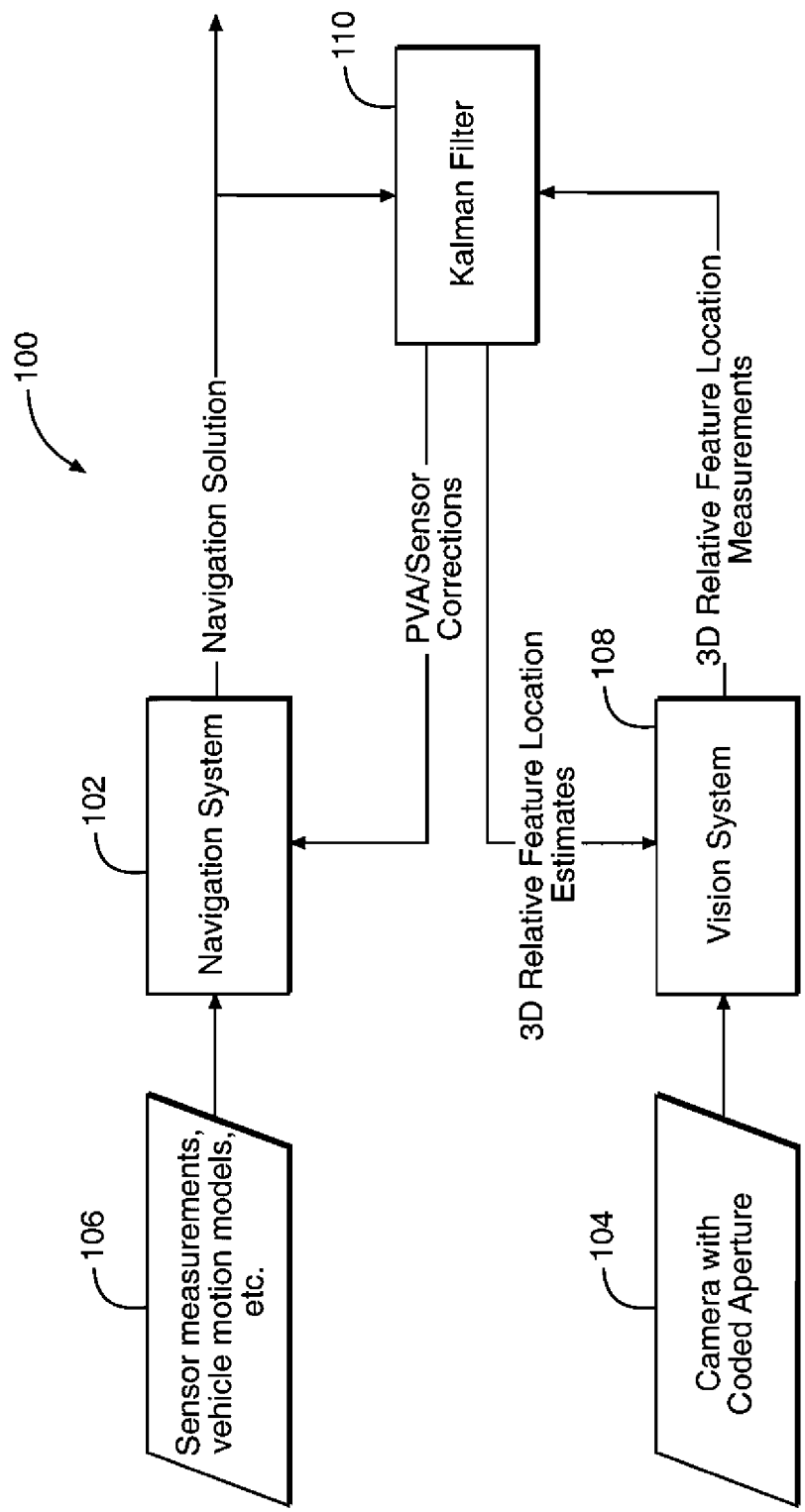
FIG. 1 illustrates a block diagram of a micro air vehicle including an image aided inertial navigation system.

FIG. 1 illustrates a block diagram 100 of micro air vehicle including an image aided inertial navigation system 102 of the present invention. By using the position, velocity, and attitude (PVA) measurements from the INS of the micro air vehicle as the navigation solution and periodically correcting the INS based on observations from image data, a micro air vehicle can be controlled in flight by a single camera having a coded aperture 104. The camera includes a camera lens having a fixed focal length to enable the present invention to utilize the defocused portions of images to determine distance as described herein. It is preferred to select a lens having a focal length providing approximately 20 pixels of blur around a point in an image. Since many inertial navigation systems can produce PVA measurements at a much faster rate than an imaging system, the present invention uses a scheme of periodic correction of the INS by the imaging system which then allows the overall navigation system to produce optimal PVA estimates at the faster rate of the INS. The coded aperture of the camera 104 enables the navigation system 102 to operate in such a way that optimal PVA estimates can be produced and updated by two-dimensional image data received by the camera 104 at the rate of a non-coded aperture system, and optimally update with range measurements when they become available.

By assuming noise in a coded aperture system's range measurements are Gaussian distributed and zero mean, the coded aperture of the camera 104 can improve a single camera system by offering a solution to scale in the initial feature location estimate. Further range measurements are then provided periodically by a vision system 108. The vision system 108 may also use the feature location estimate from this system to decrease the amount of computation time needed to produce subsequent range measurements, thereby improving the performance of the coded aperture system.

As illustrated in FIG. 1, the micro air vehicle includes a plurality of sensors 106 to measure specific forces and inertial angular rotation. The signal outputs of the sensing devices are coupled and input to the navigation system 102 which can include integration elements arranged solve kinematic equations that determine the relative change in PVA from a provided initial PVA and subsequent PVA corrections, as is understood by one skilled in the art. The output of the navigation system 102 provides a navigation solution (i.e. control signals) for controlling the vehicle which can be coupled a variety of vehicle controllers. Vehicle controllers can include wing motors for controlling the flapping of wings if used in a flapping wind device, wing control surfaces, such as ailerons, if used in a fixed wing device, and engines or motors for adjusting vehicle speed as is known by those skilled in the art.

The vision system 108 receives signals from the camera 104 which are then processed to provide three dimensional feature location measurements to a Kalman Filter 110 to be describe later herein in additional detail.

Figure 2:
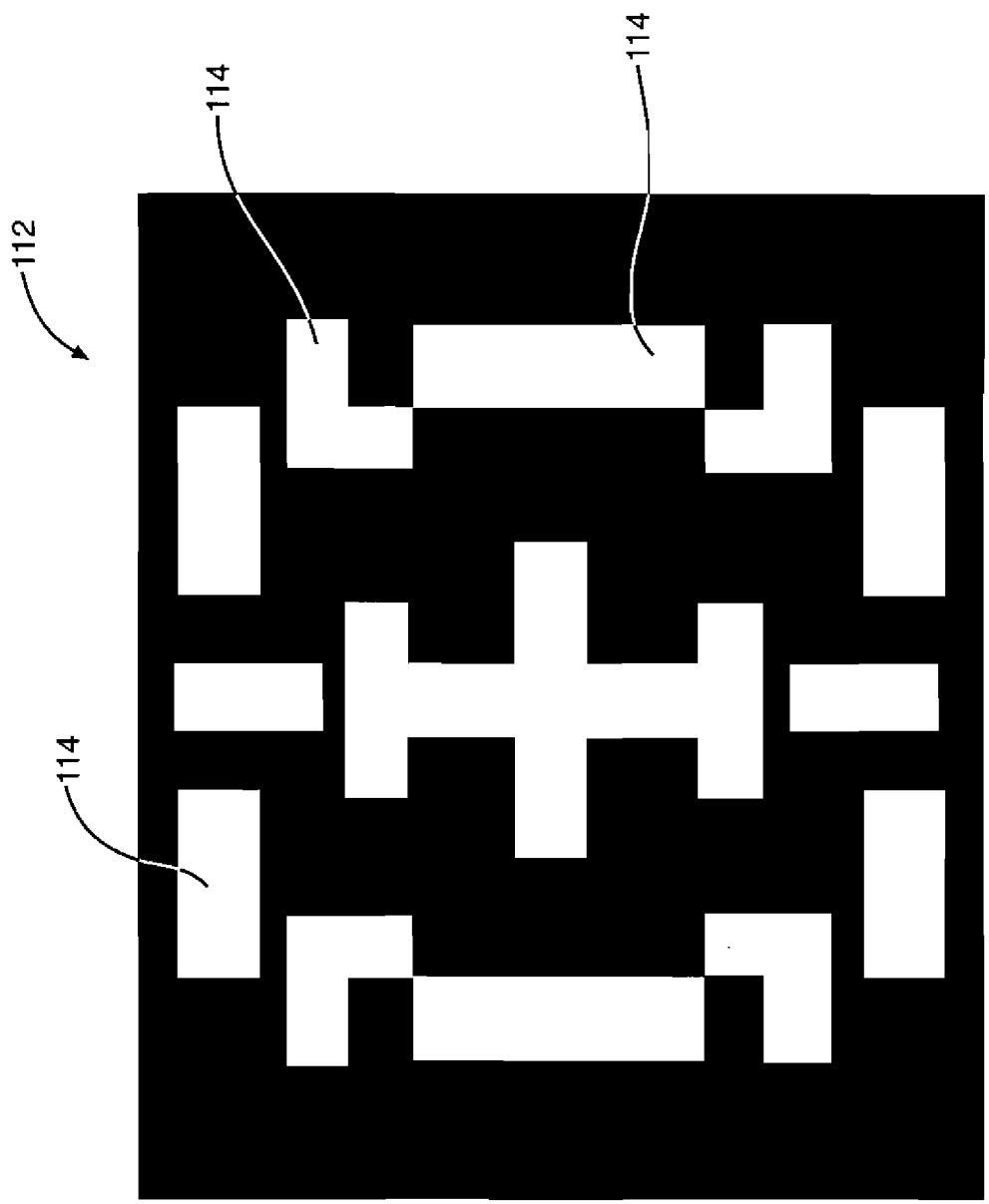
FIG. 2 illustrates one example of a coded aperture in a lens system.

FIG. 2 illustrates one example of a coded aperture 112 used in the present invention. The coded aperture 112 replaces the more traditional circularly shaped aperture typically found in a camera lens system where the traditional aperture has a controllable diameter for allowing more or less light to enter the camera. In the case of the coded aperture 112, a flat black screen is formed to include a plurality of smaller holes or apertures 114 arranged in a predetermined pattern such as illustrated in FIG. 2. By replacing the traditional aperture with a coded aperture, the normally smooth defocus blur is replaced with structured defocus blue which enables separability of defocus blur from naturally occurring smooth image gradients within a single image. This separability provides a means for estimating the angle and distance from a camera to observed features in a single image.

Figure 3:
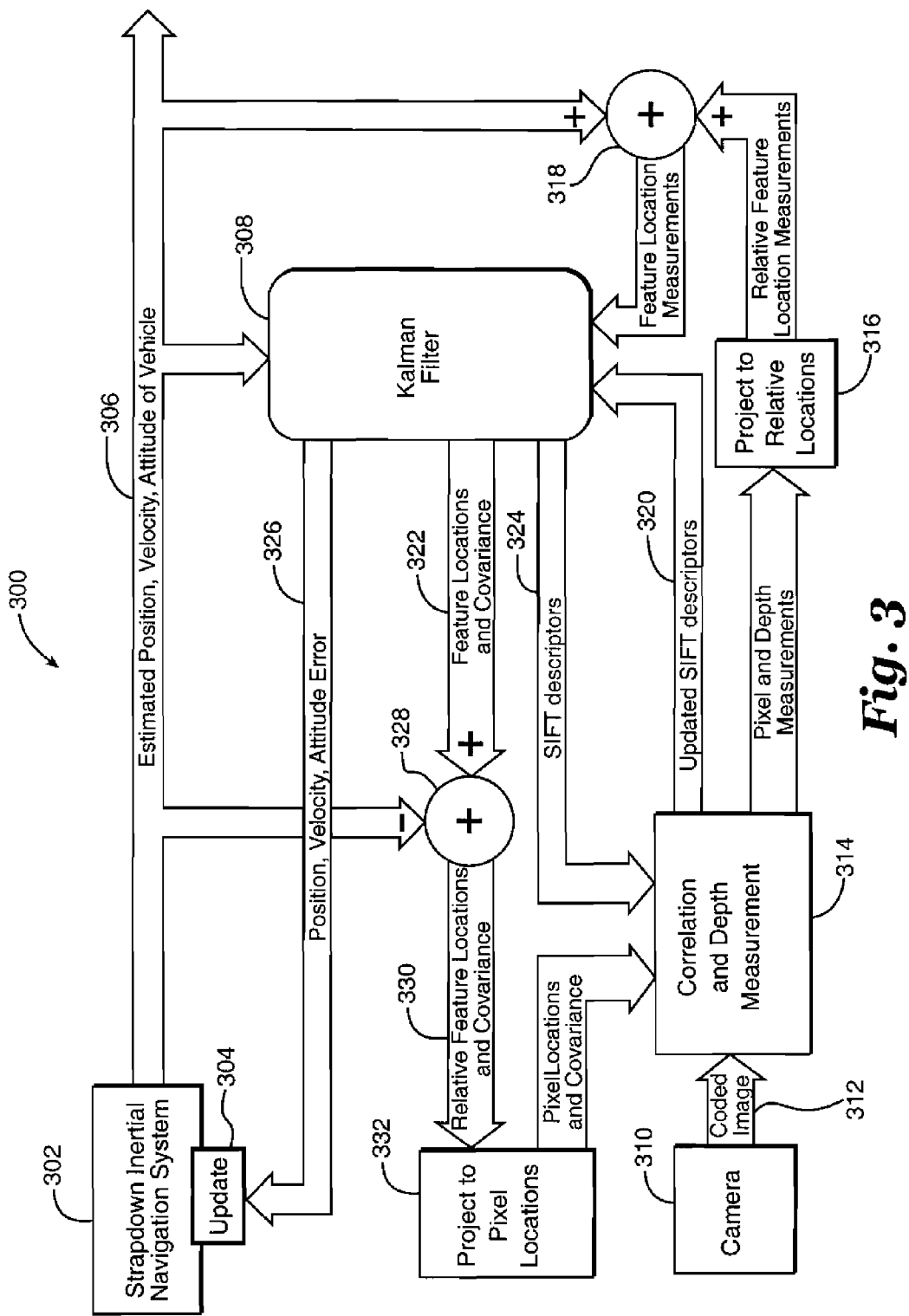
FIG. 3 illustrates a more detailed block diagram of a control system for the present invention.

FIG. 3 illustrates a more detailed block diagram 300 of a control system for the present invention. In the described embodiment of FIG. 3, the MAV includes a strapdown inertial navigation system 302, commonly used in MAVs and typically incorporating a solid state navigational system including discrete integrated electro-mechanical or electro-optical sensors. Such systems can include accelerometers, gyroscopes, or other motion sensing devices to determine vehicle orientation such as roll, pitch, and yaw. The present invention, however, is equally applicable to mechanical navigational systems or to navigational systems utilizing a combination of mechanical and solid state devices.

The navigation system 302 is continually updated at an input 304 and generates an estimated position, velocity, and attitude of the vehicle 306 at discrete periods of time determined by the requirements of the vehicle control system. The estimated PVA of the system is used to as an input to a Kalman filter 308 which incorporates a recursive data processing algorithm to provide a continuous update of the position, velocity, and attitude of the vehicle based on the prior values of the PVA and current estimated values of PVA based on the output of a digital camera 310. The camera 310 incorporates the previously described coded aperture 112. The output 312 of the camera 310 provided a coded image to a correlation and depth measurement calculator 314 typically embodied in either software or firmware as would be understood in the art.

Figure 4:
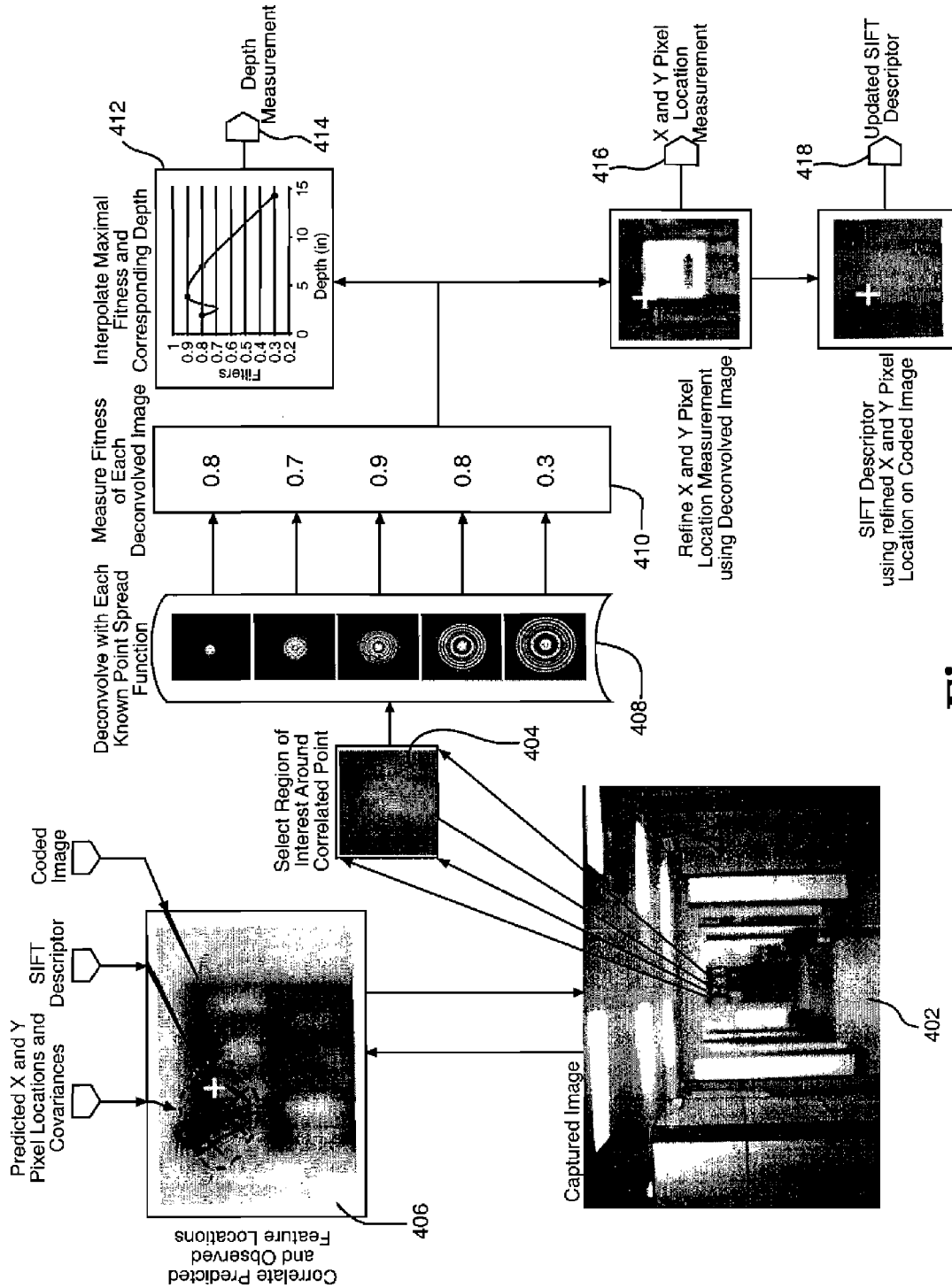
FIG. 4 illustrates a schematic diagram of imaging a vehicle location and providing updated direction and range measurements based on observed pixels from a captured image.

The operation of the calculator 314 can be further understood with respect to FIG. 4 illustrating the process of imaging vehicle location and providing updated direction and range measurements based on observed pixels from a captured image. As seen in FIG. 4, a captured image 402 includes a portion 404 of interest which has been selected by an operator operating the vehicle. The selected region of interest is further illustrated in additional detail at 406 showing predicted x and y pixel locations, marked with an X, and a best match pixel location, marked with a plus sign. The best match pixel location is determined according to a scale invariant feature transform which is continuously updated based on the observed feature locations according to a deconvolution algorithm the operation of which is schematically illustrated at deconvolve block 408 and a measured fitness block 410.

Because the lens system including the coded aperture is predetermined and known, the selected region 404 can be deconvolved with known point spread functions. The know point spread functions at block 408 are used to deconvolve the selected region by a comparison which compares the viewed selected image with previously determined point sources of light at a given distance. Each of the pixels of the selected region are measured to determine the fitness of each deconvolved image and a number indicating the best fit with the know point spread is determined. For instance, at block 410, a numerical value (i.e. 0.8, 0.7, 0.9, 0.8, and 0.3) indicates the best correspondence of the selected region of interest to the known point spread functions. These values are then interpolated at block 412 where a depth measurement (range) is provided as signal 414, as well as an x and y pixel location measurement is provided as signal 416. This information is also used to refine the scale invariant feature transform (SIFT) descriptor signal at 418.

Returning to FIG. 3, once the pixel and depth measurements have been determined at block 314, each is transmitted to be projected to relative locations at block 316. The relative feature locations and measurements are added to the estimated PVA of the vehicle at an adder 318 and input to the Kalman filter 308 which also receives the estimated PVA of the vehicle, and updated SIFT descriptors signals 320 generated by the correlation and depth measurement calculator 314.

For each imaged location, a two dimensional homogenous vector is determined to capture the direction of the feature in the camera frame, and submitted to the Kalman filter as a measurement. The vision system can also use the coded aperture information to determine the range of the feature from the camera. In anticipation of significant computational complexity in determining a range measurement, such a measurement may not be established for every feature at the same rate in which the homogenous vectors are found. When the vision system has determined a range measurement for a feature, the range measurement and an estimation of the standard deviation of the range measurement are submitted to the Kalman filter as an additional measurement.

As stated above, the system is able to provide predicted feature location and covariance information for previously tracked features.

The Kalman matrices are augmented according to the feature location measurements, the updated SIFT descriptors and the estimated PVA of the vehicle. The features can be represented as follows:
  $S_c$ is the vector from the camera to a feature in the scene which includes both distance and direction information.
  r is the range from the camera to the feature
  $N_s$ is the navigation state of the Kalman filter
  $f(N_s)$ is a function of the navigation state
  To determine a change in range with respect to a feature location vector change in the camera frame, the following equation is incorporated into the Kalman filter:

$$\frac{dr}{ds_c} = \frac{s_c}{|s_c|}$$

To determine a change in range with respect to a change in any given function of the navigation state, the chain rule can be applied as follows:

$$\frac{\delta r}{\delta f(N_s)} = \left(\frac{\delta s_c}{\delta f(N_s)}\right)\left(\frac{\delta r}{\delta s_c}\right)$$

This approach is expected to offer an improvement in the efficiency of the vision system by constraining the search space for a feature in a new image when establishing correspondence in both direction and range. Because range determination is expected to be computationally complex (increasing in complexity with an increase in the range search space under consideration), minimizing the range search space should improve the efficiency of the range determination algorithm. A determination must also be made as to which features should be processed for a given image frame. The feature range evaluation should be scheduled such that the features for which a range measurement is expected to yield the greatest improvement to system performance should be evaluated. Optimal scheduling should then establish priority as a function of the deviation of the feature range estimate as well as the result of residual analysis. Because two-dimensional correspondence requires significantly less computation than range determination, a metric of the quality of the two-dimensional correspondence should also be included in the priority function to mitigate range determination of features for which there is a lower likelihood that a correct correspondence has been established.

The Kalman filter 308 incorporates the INS solution and the feature location measurements from the vision system, with and without range, to create an optimal estimate of the PVA and three dimensional feature locations in the navigation frame. The feature location estimates and covariance are propagated from the Kalman filter and provided to the vision system.

The Kalman filter 308 generates feature locations and covariance signals 322, SIFT descriptor signals 324 and PVA error signals 326. The estimated PVA signals are subtracted from the feature locations at 328 to derive relative feature locations and covariance signals 330, which are then used to project to pixel locations 332, which are then used at the correlation and depth measurement calculator 314.

A Kalman filter influence matrix is incorporated into the Kalman filter as is understood by those skilled in the art. The matrix comprises the following equation to determine a change in the homogenous pointing vector relative to vehicle movement:

$$\frac{\delta s^c}{\delta p^n} = \lfloor s^c \rfloor_3 \left( \frac{\delta s^c}{\delta p^n} \right) - \frac{s^c \left\lfloor \frac{\delta s^c}{\delta p^n} \right\rfloor_3}{(\lfloor s^c \rfloor_3)^2}$$

$p^n$ is position of vehicle in nav frame $\lfloor \cdot \rfloor_3$ indicates only the third component of a vector Additionally, the portions of the influence matrix that pertain to a given feature location is as follows:

$$H_{p^n}^s = \begin{bmatrix} T_c^{pix} \frac{\delta s^c}{\delta p^n} \\ \frac{\delta r}{\delta s_c} \end{bmatrix}$$

$T_c^{pix}$ is a transformation to a homogenous pointing vector onto pixel plane $H_{p^n}^s$ is the overall influence matrix The Kalman filter feature location covariance is determined from pixel and depth measurement error as follows:

$$R_s = \begin{bmatrix} R_z & 0 \\ & 0 \\ \hline 0 \ 0 & R_r \end{bmatrix} \text{ where}$$

$R_z$ is error from pixel location error $$P_{s_c, s_c} = ((H_{p^n}^s)^T (R_s)^{-1} H_{p^n}^s)^{-1}$$

$P_{s_c, s_c}$ is the covariance matrix of $s_c$

The present invention incorporates range information in a manner that removes the need to represent direction to the feature as a homogenous pointing vector that conveys direction only. The homogenous pointing vector representation is still used to include feature location measurements for which range information is not obtained. As stated earlier, an assumption is made that the error in the range measurements from a coded aperture vision system are Gaussian distributed and unbiased.

Although the coded aperture vision system produces a range estimate to a feature point without a priori information, the estimation performance or computation time may be improved if a priori information is available. Computation time may be reduced by limiting fitness evaluation to ranges with a higher a priori probability. Alternatively, a similar total number of fitness evaluations for given feature point ranges may performed, while the possible values of the range are limited to those with a higher a priori probability. When design constraints allow two cameras to be spaced far apart on a vehicle equipped with an inertial navigation system, a stereoscopic vision system is appropriate for aiding through an indoor environment. For vehicles too small to permit such placement of multiple cameras, the aiding capabilities similar to those provided by a stereoscopic vision system may be obtained by using a vision system augmented with a coded aperture as described herein.

While the present invention has been described with specific embodiments thereof, alternatives, modifications and variations may be apparent to those skilled in the art. For instance, the present invention is not limited to MVAs but can also be used with ground vehicles. The system may also be used to determine three-dimensional locations of objects relative to the imaging sensor or camera with and without access to satellite based positioning. In addition, while a recursive estimator is described including a Kalman filter, other methods and apparatus can include the extended Kalman filter, unscented Kalman filter, and a multi-hypothesis filter. Accordingly, it is intended to embrace all such alternatives, modifications and variations that fall within the spirit and broad scope of the appended claims.

What is claimed is:

1. A method for measuring the flight path of a micro air vehicle having an inertial navigation system, comprising:
   providing a plurality of point spread functions, each function representing an observed source of light at a different predetermined distance;
   capturing an image with a single camera lens and a coded aperture;
   selecting a pixel from the captured image;
   comparing the selected pixel with the plurality of point spread functions;
   determining from the comparing step a depth measurement for the selected pixel; and
   measuring the flight path of the micro air vehicle using the determined depth measurement for the selected pixel.

2. A method for tracking feature locations along the flight path of a micro air vehicle having an inertial navigation system, comprising:
   providing a plurality of point spread functions, each function representing an observed source of light at a different predetermined distance;
   capturing an image with a single camera lens and a coded aperture;
   selecting a pixel from the captured image;
   comparing the selected pixel with the plurality of point spread functions;
   determining from the comparing step a depth measurement for the selected pixel; and
   measuring the location of tracked features using the determined depth measurement for the selected pixel.

3. The method of claim 2, wherein the measuring step comprises dynamic Bayesian network to provide an estimate of a three dimensional feature location of captured image.

4. The method of claim 3, wherein the estimated three dimensional feature locations include an x location, a y location, and a range from the micro air vehicle.

5. The method of claim 4, wherein the dynamic Bayesian network comprises a recursive estimator.

6. The method of claim 5, wherein the recursive estimator comprises a Kalman filter.

7. The method of claim 4, wherein the Kalman filter determines a change in range with respect to the feature location using the equation as follows:

$$\frac{dr}{ds_c} = \frac{s_c}{|s_c|}.$$

8. A micro air vehicle comprising:
a plurality of sensors;
a navigation system coupled to the plurality of sensors;
a single camera, including a coded aperture and a fixed focal length lens;
a vision system coupled to the single camera; and
a dynamic Bayesian network coupled to the vision system and the navigation system; the dynamic Bayesian network providing a plurality of signals to the navigation system, wherein the plurality of signals include updated information regarding a change in the range and direction of the vehicle.

9. The micro air vehicle of claim 7, wherein the dynamic Bayesian network comprises a recursive estimator.

10. The micro air vehicle of claim 8, wherein the recursive estimator comprises a Kalman filter.

* * * * *